(12) United States Patent
Tanabe et al.

(10) Patent No.: US 7,268,311 B2
(45) Date of Patent: Sep. 11, 2007

(54) TOUCH PANEL

(75) Inventors: Koji Tanabe, Osaka (JP); Kenichi Matsumoto, Osaka (JP); Shoji Fujii, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 52 days.

(21) Appl. No.: 11/240,353

(22) Filed: Oct. 3, 2005

(65) Prior Publication Data

US 2006/0072045 A1 Apr. 6, 2006

(30) Foreign Application Priority Data

Oct. 4, 2004 (JP) ............... 2004-291218

(51) Int. Cl.
*H01H 9/00* (2006.01)
(52) U.S. Cl. ............ 200/314; 200/341
(58) Field of Classification Search ............ 200/5 A, 200/512, 314–341; 178/18.01–18.07, 18.1; 345/173–179
See application file for complete search history.

(56) References Cited

U.S. PATENT DOCUMENTS

| 6,549,195 B2 * | 4/2003 | Hikida et al. ............ 345/173 |
| 6,572,941 B1 | 6/2003 | Murakami et al. |
| 6,697,132 B2 * | 2/2004 | Saiki et al. ............ 349/96 |
| 6,791,640 B1 * | 9/2004 | Okamoto et al. ......... 349/113 |
| 7,071,925 B2 | 7/2006 | Matsuda et al. |
| 2004/0239641 A1 | 12/2004 | Takahata et al. |
| 2006/0050063 A1 | 3/2006 | Tanabe et al. |

FOREIGN PATENT DOCUMENTS

| JP | 2000-10732 | 1/2000 |
| JP | 2001-034418 | 2/2001 |
| JP | 2002-297319 | 10/2002 |
| JP | 2003-50674 | 2/2003 |
| WO | 03/023594 | 3/2003 |

* cited by examiner

*Primary Examiner*—Elvin Enad
*Assistant Examiner*—Lisa Klaus
(74) *Attorney, Agent, or Firm*—Wenderoth, Lind & Ponack, L.L.P.

(57) ABSTRACT

A touch panel includes a first substrate, a second substrate, a polarizing plate and a compensating plate. A first conductive layer is formed on the first substrate. The second substrate is formed so as to face the first substrate and has a second conductive layer facing the first conductive layer at a certain interval. The polarizing plate having a heat shrinkage ratio larger than that of the first substrate is laminated on a side, which is opposite to the second substrate, at the first substrate. The compensating plate having substantially an identical heat shrinkage ratio with that of the first substrate is laminated on a side, which is opposite to the first substrate, at the polarizing plate.

4 Claims, 2 Drawing Sheets

TOUCH PANEL

BACKGROUND OF THE INVENTION

1. Field of the Invention

The present invention relates to a touch panel used for operation of various types of electronic devices.

2. Background Art

In recent years, various types of electronic devices such as portable phones or car navigation systems have become more functional and diversified. This involves an increase of devices in which their respective functions are selected with a light-transmissive touch panel attached on the front surface of a display element such as a liquid crystal panel. Therefore, touch panels with high visibility and reliable operability are demanded. A user presses a touch panel with his/her finger, a pen or the like for operation to select a function while viewing the content of the display element on the back surface of the touch panel through the touch panel. The conventional touch panel is described hereinafter with reference to the drawing. In the drawing, a dimension in a thickness direction is enlarged to understand the structure easily.

FIG. 3 is a sectional view of the conventional touch panel. In the touch panel, light-transmissive upper conductive layer 23 made of indium oxide tin or the like is formed at a lower surface of film-like and light-transmissive upper substrate 21 made of polycarbonate or the like. Lower conductive layer 24, which is similar to upper conductive layer 23, is formed on an upper surface of light-transmissive lower substrate 22. A plurality of dot spacers (not illustrated) is formed of insulating resin at certain intervals on an upper surface of lower conductive layer 24. A pair of upper electrodes (not illustrated) are formed at both ends of upper conductive layer 23, and a pair of lower electrodes (not illustrated) are formed at both ends of lower conductive layer 24 in a direction perpendicular to the upper electrodes.

Meanwhile, the outer periphery of upper substrate 21 and the outer periphery of lower substrate 22 are bonded to each other by means of a bonding layer (not illustrated) coat-formed on the upper and lower surfaces of frame-like spacer 25, thus upper conductive layer 23 faces lower conductive layer 24 at a certain interval. Polarizing plate 26 is produced by laminating triacetyl cellulose or the like on an upper surface and a lower surface of polyvinyl alcohol with iodine or dye oriented. Polarizing plate 26 is laminated on an upper surface of upper substrate 21, so that the touch panel is constructed.

The touch panel constructed in this way is arranged on the front surface of a liquid crystal display element or the like, to be attached to an electronic device, and a pair of upper electrodes and lower electrodes are connected to the electronic circuit (not illustrated) of the device.

In the structure mentioned above, the user presses an upper surface of polarizing plate 26 with his/her finger, a pen or the like for operation while viewing the content of the liquid crystal display element on the back surface of the touch panel. Consequently, upper substrate 21 bends along with polarizing plate 26, thereby causing the pressed position of upper conductive layer 23 to contact with lower conductive layer 24. Then, the electronic circuit applies voltage to the upper and lower electrodes sequentially, and detects the pressed position owing to the voltage ratio between the electrodes. As a result, various functions of the device are selected.

External light such as sunlight or lamplight from above transmits through polarizing plate 26 first. At this time, any one of lightwave among an X-directional lightwave and a Y-directional lightwave perpendicular to the X-directional lightwave is absorbed into polarizing plate 26. Therefore, the external light becomes only linear polarized light in the direction, where the lightwave has not been absorbed, and enters onto upper substrate 21 through polarizing plate 26.

Then, this light passes through upper substrate 21 and reflects upward at lower conductive layer 24. Intensity of the reflected light is reduced by substantially half because of polarizing plate 26 discussed above. As a result, reflection exited from the upper surface of polarizing plate 26 decreases, so that the liquid crystal display element or the like at the back surface can be seen easily. Such a touch panel is disclosed in Unexamined Japanese Patent Publication No. 2002-297319, for example.

As mentioned above, according to the conventional touch panel, because polarizing plate 26 is laminated on the upper surface of upper substrate 21, reflection of the external light is prevented, so that visibility is improved. However, upper substrate 21 made of polycarbonate or the like has a heat shrinkage ratio of approximately 0.01% after being left for 24 hours at 85° C. On the other hand, polarizing plate 26, which is produced by laminating triacetyl cellulose or the like onto polyvinyl alcohol, has a heat shrinkage ratio of approximately 0.5%. Such upper substrate 21 and polarizing plate 26 are laminated and bonded to each other. Therefore, when the touch panel is used in an ambient environment with high temperature and humidity, the difference in heat shrinkage ratio causes downward warpage in the intermediate part of upper substrate 21. This tends to result in unstable contact between upper conductive layer 23 and lower conductive layer 24.

SUMMARY OF THE INVENTION

A touch panel of the present invention includes a first substrate, a second substrate, a polarizing plate and a compensating plate. A first conductive layer is formed on the first substrate. The second substrate is formed so as to face the first substrate, and has a second conductive layer facing the first conductive layer at a certain interval. The polarizing plate having a heat shrinkage ratio larger than that of the first substrate is laminated on a side, which is opposite to the second substrate, at the first substrate. The compensating plate having substantially an identical heat shrinkage ratio with that of the first substrate is laminated on a side, which is opposite to the first substrate, at the polarizing plate. Sandwiching the polarizing plate having large heat shrinkage ratio by the compensating plate and the first substrate both of which have small heat shrinkage ratios prevents warpage in use under conditions with high temperature and humidity. Consequently, a touch panel with excellent visibility and reliable operability can be obtained.

DETAILED DESCRIPTION OF THE INVENTION

Figure 1A:
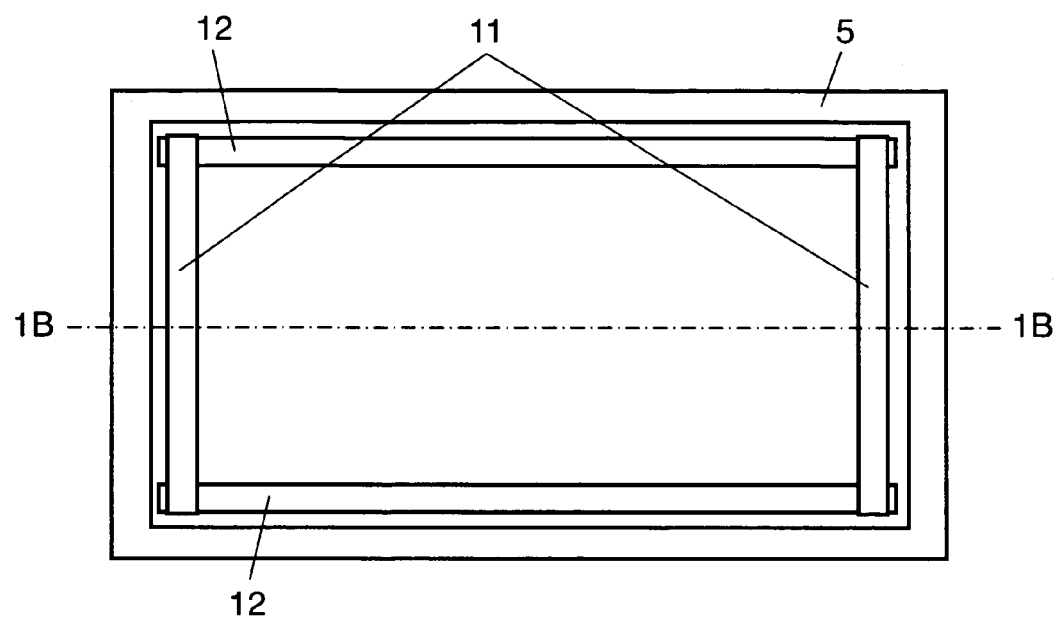
FIG. 1A is a top perspective view of a touch panel in accordance with an exemplary embodiment of the present invention.
Figure 1B:
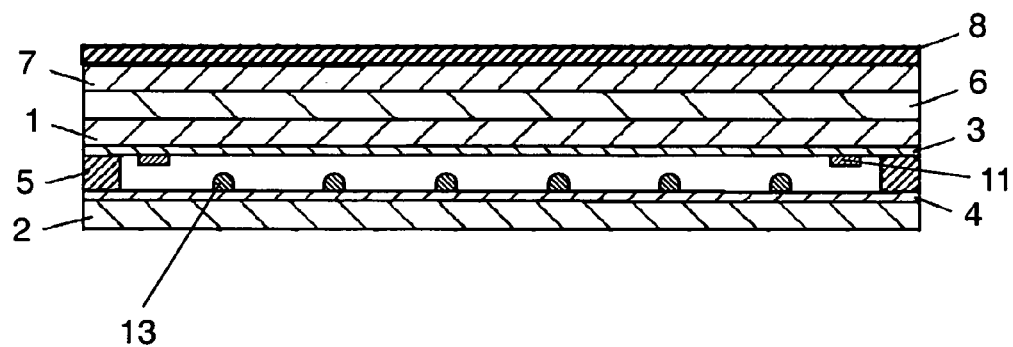
FIG. 1B is a sectional view of the touch panel shown in FIG. 1A.

FIG. 1A is a top perspective view of a touch panel in accordance with an exemplary embodiment of the present invention. FIG. 1B is a sectional view of the touch panel shown in FIG. 1A taken along line 1B-1B. To understand its structure easily, dimensions in a thickness direction are enlarged in the drawing.

Upper substrate (hereinafter referred to as "substrate") 1, which is a film-like light-transmissive first substrate, is made of polyethersulfone, polycarbonate or the like. Lower substrate (hereinafter referred to as "substrate") 2, which is a light-transmissive second substrate provided so as to face substrate 1, is made of glass, acryl, polycarbonate or the like. Upper conductive layer (hereinafter referred to as "conductive layer") 3, which is a light-transmissive first conductive layer made of indium-tin oxide, tin oxide or the like, is formed by sputtering or the like, at a lower surface of substrate 1, namely at a side facing substrate 2. Lower conductive layer (hereinafter referred to as "conductive layer") 4, similar to conductive layer 3, is formed at an upper surface of substrate 2, namely at a side facing substrate 1. Dot spacers 13 are formed of insulating resin such as epoxy or silicon, at certain intervals at an upper surface of conductive layer 4. A pair of upper electrodes 11, which are made of silver, carbon or the like, are formed at both ends of conductive layer 3. A pair of lower electrodes 12, which are perpendicular to upper electrodes 11, are formed at both ends of conductive layer 4.

Frame-like spacer 5 is made of nonwoven fabric, polyester film or the like. The outer periphery of substrate 1 and the outer periphery of substrate 2 are bonded by means of a bonding layer (not illustrated) coat-formed on an upper surface and a lower surface of spacer 5, and conductive layers 3 and 4 face each other at a certain interval.

Flexible polarizing plate 6 is produced by laminating triacetyl cellulose or the like on an upper surface and a lower surface of polyvinyl alcohol where iodine or dye is absorbed, drawn and oriented. Polarizing plate 6 is laminated on the upper surface of substrate 1, and bonded by means of an adhesive (not illustrated) such as acrylic. In other words, polarizing plate 6 is laminated on the surface, which is opposite to the surface facing substrate 2, at substrate 1.

Compensating plate 7, which is film-like and light-transmissive, is made of polycarbonate, polyethersulfone or the like. Compensating plate 7 is laminated and bonded onto an upper surface of polarizing plate 6. In other words, compensating plate 7 is laminated on a side, which is opposite to substrate 1, at polarizing plate 6. Further, light-transmissive hard-coating layer 8, made of photo-setting acrylic resin or the like, is provided at an upper surface of compensating plate 7.

As discussed above, polarizing plate 6 is produced by laminating triacetyl cellulose or the like on polyvinyl alcohol, and its heat shrinkage ratio is approximately 0.5% after being left for 24 hours at 85° C. Both compensating plate 7 and substrate 1, which are laminated at the upper surface and the lower surface of polarizing plate 6 respectively, are made of polycarbonate having a heat shrinkage ratio of approximately 0.01%, polyethersulfone having a heat shrinkage ratio of approximately 0.02% or the like. In a word, compensating plate 7 and substrate 1, whose heat shrinkage ratios are equal or similar to each other and smaller than that of polarizing plate 6, sandwich polarizing plate 6 having large heat shrinkage ratio. Compensating plate 7 may be made of other material than substrate 1 as long as its heat shrinkage ratio is equal to or smaller than that of substrate 1.

The touch panel composed in this way is arranged at the front surface of a liquid crystal display element or the like to be attached to an electronic device, and a pair of upper electrodes 11 and a pair of lower electrodes 12 are respectively connected to the electronic circuit (not illustrated) of the device.

In the above-mentioned structure, a user presses an upper surface of hard-coating layer 8 with his/her finger, a pen or the like for operation while viewing the content of the liquid crystal display element at the back surface of the touch panel. Consequently, substrate 1 bends along with compensating plate 7 and polarizing plate 6, causing the pressed position of conductive layer 3 to contact conductive layer 4. Then, the electronic circuit applies voltage to upper electrodes 11 and lower electrodes 12 sequentially, and detects the pressed position owing to the voltage ratio between the electrodes. As a result, various functions of the device are selected.

External light such as sunlight or lamplight from above, after passing through hard-coating layer 8 and compensating plate 7, transmits through polarizing plate 6. At this time, for example, when polarizing plate 6 absorbs a Y-directional lightwave among an X-directional lightwave and a Y-directional lightwave perpendicular to the X-directional lightwave, transmitted light becomes X-directional linear polarized light and enters substrate 1 from polarizing plate 6.

Then, this light passes through substrate 1 and reflects upward at conductive layer 4. Intensity of the reflected light is reduced by substantially half because of polarizing plate 6 discussed above. As a result, reflection exited from the upper surface of hard-coating layer 8 through polarizing plate 6 and compensating plate 7 decreases, so that visibility of the liquid crystal display element or the like at the back surface becomes excellent.

In addition, as discussed above, compensating plate 7 and substrate 1, whose heat shrinkage ratios are equal or similar to each other and smaller than that of polarizing plate 6, sandwich polarizing plate 6 having large heat shrinkage ratio. Consequently, even when the touch panel is used in an ambient environment with high temperature and humidity, compensating plate 7 and substrate 1 suppress warpage of polarizing plate 6 having large heat shrinkage ratio. This prevents warpage of the entire touch panel, so that the touch panel with excellent visibility and reliable operability can be obtained.

Figure 2:
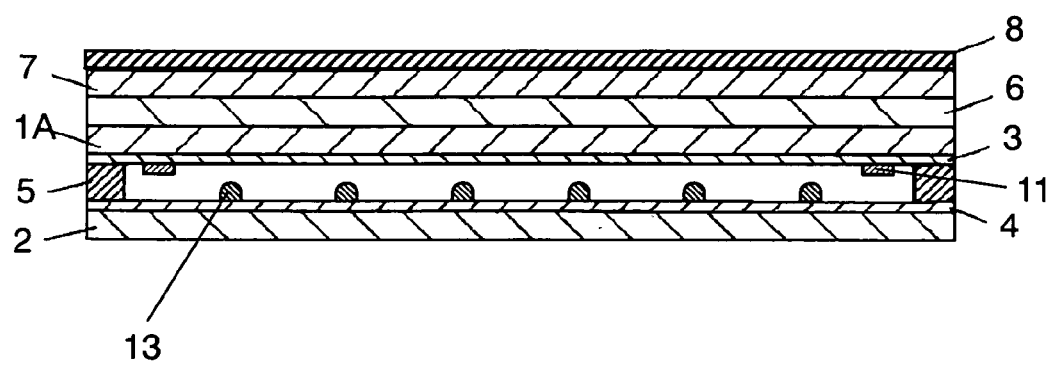
FIG. 2 is a sectional view of another touch panel in accordance with the exemplary embodiment of the present invention.
Figure 3:
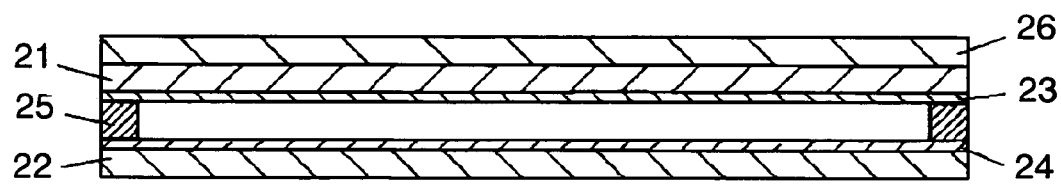
FIG. 3 is a sectional view of a conventional touch panel.

Besides, as shown in a sectional view of FIG. 2, in a case where substrate 1 is formed of flexible retardation film 1A, the reflected light, which has reflected upward at conductive layer 4, becomes a lightwave different from a lightwave passing through polarizing plate 6 in direction because of retardation film 1A. Retardation film 1A of ¼ wavelength having birefringence is formed by drawing a film such as polycarbonate or polyethersulfone. By using the structure discussed above, reflection from the upper surface of hard-coating layer 8 is eliminated, so that visibility is more improved.

In other words, external light from above, which has transmitted through polarizing plate 6 and becomes X-directional linear polarized light, for example, passes through retardation film 1A of ¼ wavelength. Therefore, linear polarized light changes to circular polarized light, and is reflected upward at conductive layer 4. Then, this reflected light, as a result of transmitting through retardation film 1A of ¼ wavelength again, changes to Y-directional linear polarized light with ½ wavelength shift, and enters polarizing plate 6. Polarizing plate 6 allows only X-directional lightwave to transmit, whereby the reflected light, which is the Y-directional linear polarized light, is not transmitted through polarizing plate 6.

In a word, the external light entered the touch panel from above reflects upward at lower conductive layer 4, however, the reflected light is blocked by polarizing plate 6 and does not exit from the upper surface of hard-coating layer 8. This structure brings excellent visibility of the liquid crystal display element or the like at the back surface without reflection.

Optical anisotropic film such as polyethylene terephthalate can be used as compensating plate 7 and substrate 1, both of which sandwich polarizing plate 6 from its upper and lower side for preventing warpage of polarizing plate 6 at high temperature and humidity. However, by using optical isotropic polycarbonate, polyethersulfone or the like without birefringence, processing for the retardation film of ¼ wavelength mentioned above can be easily executed.

Compensating plate 7 is preferably constructed by using an identical retardation film like retardation film 1A. By using this construction, lamplight, which has changed to linear polarized light through polarizing plate 6, from the liquid crystal display element or the like becomes circular polarized light by compensating plate 7. Therefore, for example, the user can easily see the lamplight, even when he/she wears polarized sunglasses for X-directional linear polarized light.

As discussed above, the touch panel of the present invention has excellent visibility and reliable operability, so that it is useful for operation of various types of electronic devices.

What is claimed is:

1. A touch panel comprising:
    a light-transmissive first substrate having a first conductive layer;
    a light-transmissive second substrate arranged so as to face the first substrate, and having a second conductive layer arranged so as to face the first conductive layer across a gap;
    a polarizing plate laminated on a side of the first substrate which faces away from the second substrate, the polarizing plate having a heat shrinkage ratio larger than that of the first substrate; and
    a compensating plate laminated on a side of the polarizing plate which faces away from the first substrate, the compensating plate having a heat shrinkage ratio substantially identical to that of the first substrate.

2. The touch panel of claim 1, wherein the first substrate and the compensating plate include at least one of polycarbonate and polyethersulfone.

3. The touch panel of claim 1, wherein the first substrate is formed of a retardation film.

4. The touch panel of claim 3, wherein the compensating plate is formed of a retardation film.

* * * * *